(12) United States Patent
Burrows

(10) Patent No.: US 10,183,874 B2
(45) Date of Patent: *Jan. 22, 2019

(54) WATER PURIFICATION SYSTEM WITH ACTIVE VIBRATION

(71) Applicant: DS Services of America, Inc., Atlanta, GA (US)

(72) Inventor: Bruce D. Burrows, Valencia, CA (US)

(73) Assignee: DS Services of America, Inc., Atlanta, GA (US)

( * ) Notice: Subject to any disclaimer, the term of this patent is extended or adjusted under 35 U.S.C. 154(b) by 723 days.

This patent is subject to a terminal disclaimer.

(21) Appl. No.: 14/575,998

(22) Filed: Dec. 18, 2014

(65) Prior Publication Data

US 2015/0166360 A1 Jun. 18, 2015

Related U.S. Application Data

(60) Provisional application No. 61/917,840, filed on Dec. 18, 2013.

(51) Int. Cl.
| | | |
|---|---|---|
| *C02F 1/36* | (2006.01) | |
| *C02F 1/28* | (2006.01) | |
| *C02F 9/00* | (2006.01) | |
| *C02F 1/34* | (2006.01) | |
| *C02F 1/44* | (2006.01) | |
| *B01D 61/02* | (2006.01) | |
| *B01D 61/10* | (2006.01) | |
| *B01D 65/02* | (2006.01) | |

(52) U.S. Cl.
CPC .............. *C02F 1/36* (2013.01); *B01D 61/025* (2013.01); *B01D 61/10* (2013.01); *C02F 1/28* (2013.01); *C02F 1/441* (2013.01); *C02F 9/005* (2013.01); *B01D 65/02* (2013.01); *B01D 2321/30* (2013.01); *C02F 1/281* (2013.01); *C02F 1/34* (2013.01); *C02F 2303/16* (2013.01); *C02F 2307/10* (2013.01)

(58) Field of Classification Search
CPC .... C02F 1/36; C02F 1/28; C02F 9/005; C02F 1/441; C02F 2303/16; C02F 1/34; C02F 2307/10; C02F 1/281; B01D 61/025; B01D 61/10; B01D 65/02; B01D 2321/30
See application file for complete search history.

(56) References Cited

U.S. PATENT DOCUMENTS

| | | |
|---|---|---|
| 4,585,554 A | 4/1986 | Burrows |
| 4,595,497 A | 6/1986 | Burrows |

(Continued)

*Primary Examiner* — David A Reifsnyder
(74) *Attorney, Agent, or Firm* — Seyfarth Shaw LLP; Brian Michaelis

(57) ABSTRACT

The water purification system for flow-coupled installation with a tap water inflow for producing a relatively purified water outflow includes a purification unit having a tap water inlet port for receiving tap water inflow and a purified water outlet port for dispensing purified water outflow from said purification unit. A particulate catalyst retained within the purification unit is in flow through relation relative to said the water inflow and purified water outflow and catalyzes contaminants as the tap water inflow travels through the purification unit. A particulate agitator associated translates vibration to the particulate catalyst for substantially preventing channeling therein during relatively slow tap water inflow through the purification unit.

22 Claims, 9 Drawing Sheets

(56) References Cited

U.S. PATENT DOCUMENTS

| | | | |
|---|---|---|---|
| 4,657,674 A | | 4/1987 | Burrows |
| 5,045,197 A | | 9/1991 | Burrows |
| 5,135,654 A | | 8/1992 | Heskett |
| 5,269,919 A | * | 12/1993 | von Medlin .......... B01D 61/04 210/256 |
| 7,673,516 B2 | * | 3/2010 | Janssen ................ B01F 5/0695 210/708 |
| 9,919,933 B2 | * | 3/2018 | Burrows .................. C02F 1/36 |
| 2017/0036924 A1 | * | 2/2017 | Burrows .................. C02F 1/36 |
| 2017/0334743 A1 | * | 11/2017 | Burrows .................. C02F 1/28 |
| 2017/0334744 A1 | * | 11/2017 | Burrows .................. C02F 1/28 |
| 2017/0334745 A1 | * | 11/2017 | Burrows .................. C02F 1/28 |

* cited by examiner

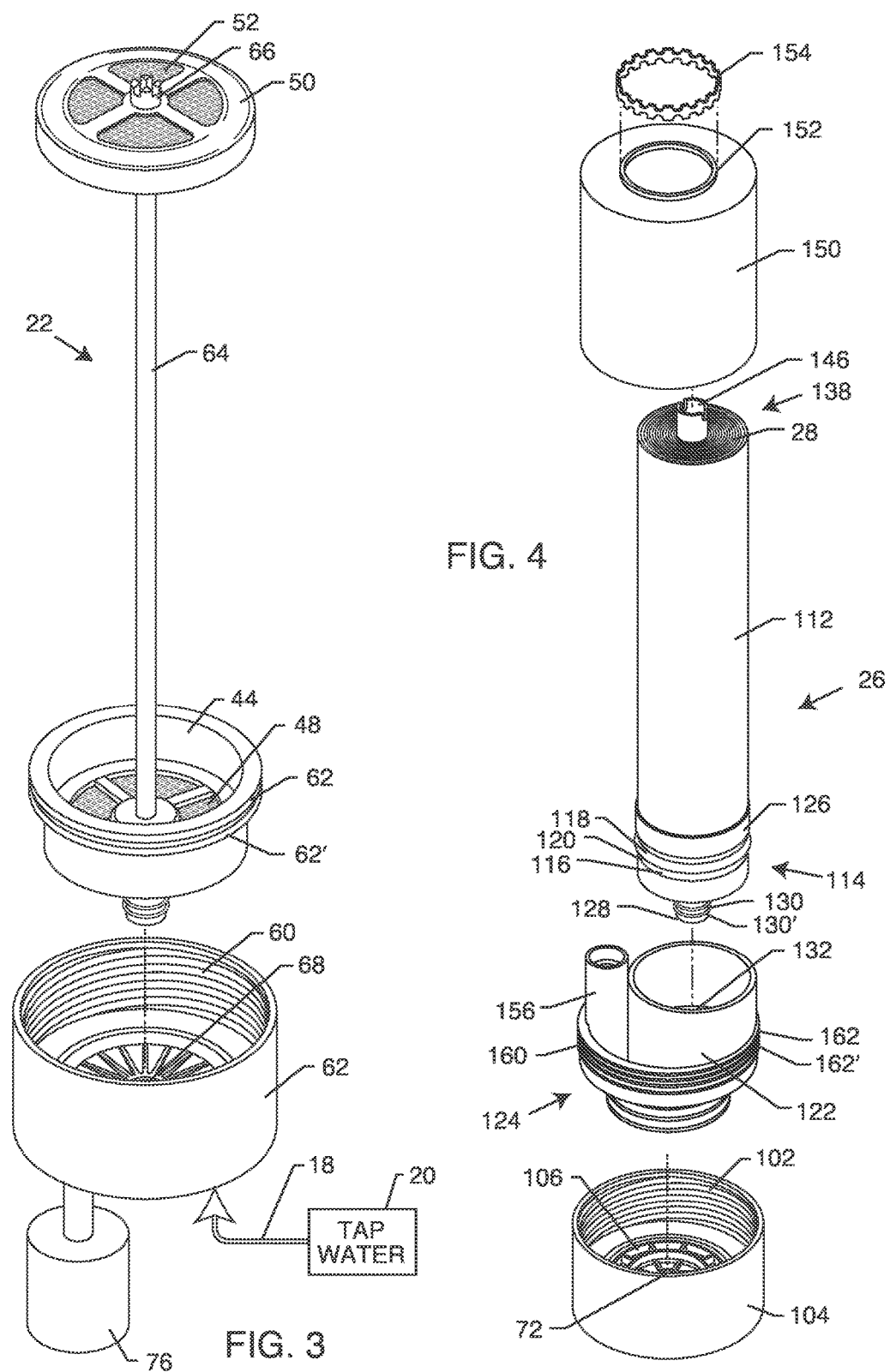

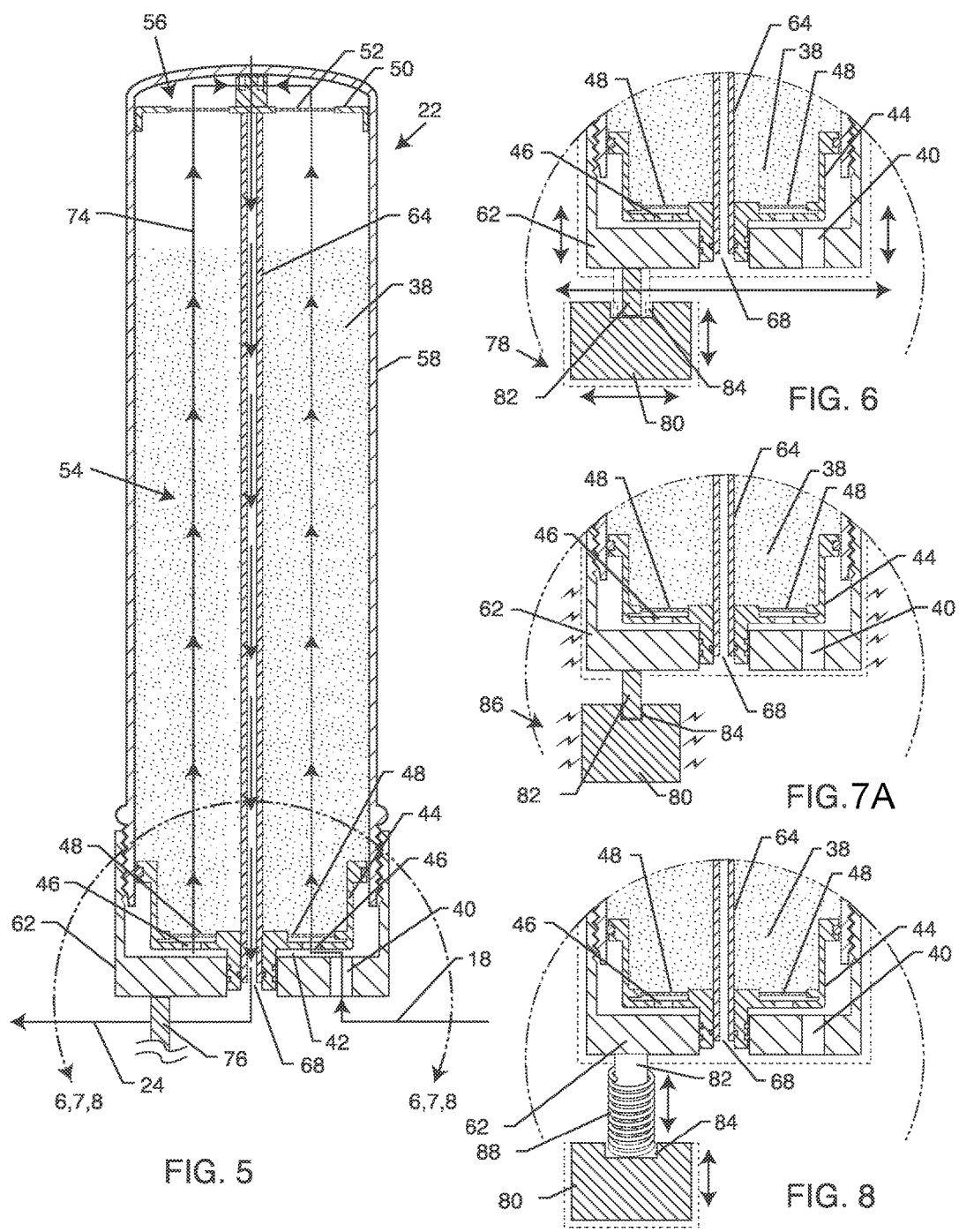

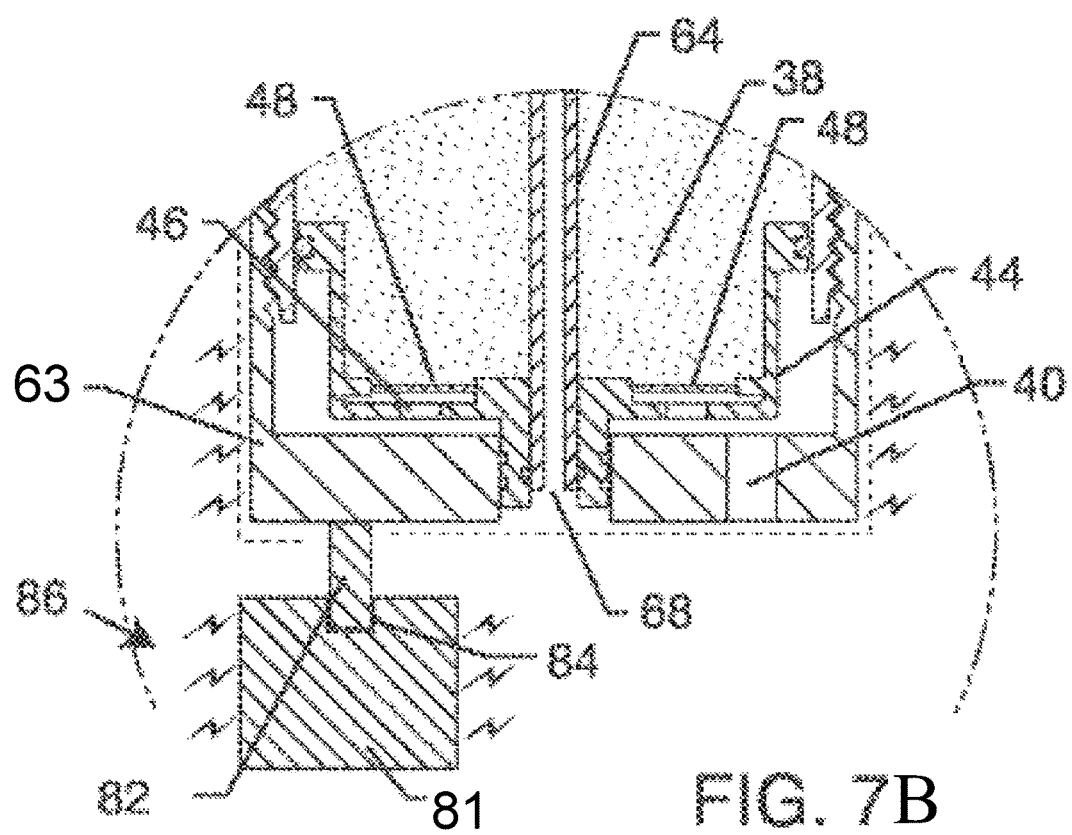

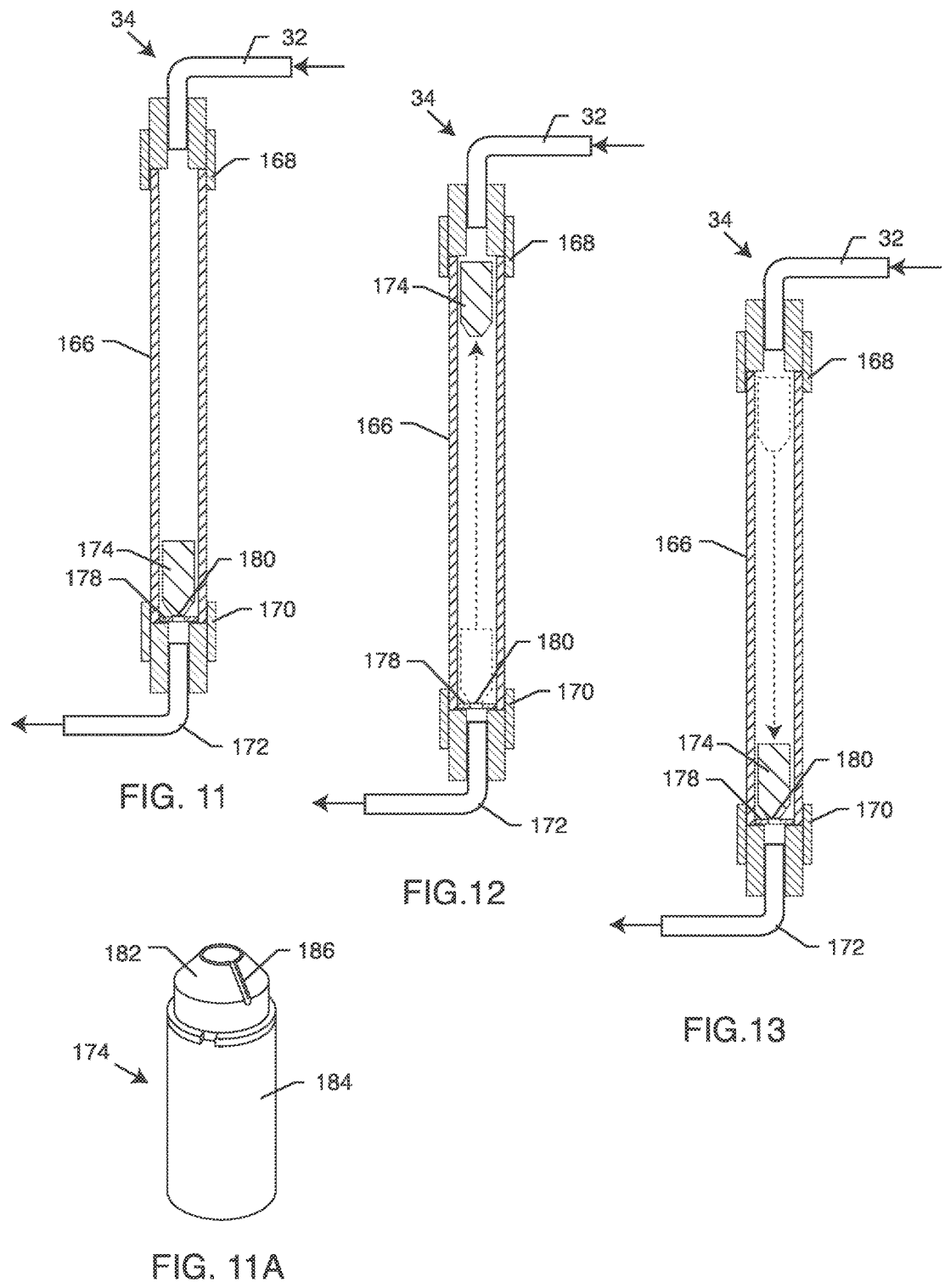

WATER PURIFICATION SYSTEM WITH ACTIVE VIBRATION

BACKGROUND OF THE INVENTION

The present invention relates generally to improvements in water purification systems designed to remove dissolved ionic material and other contaminants from an ordinary supply of tap water or the like. More specifically, the present invention relates to an active vibration water purification system designed to prevent channeling in particulate catalyst water filtration media during times of relatively slow water flow to extend the operational lifetime and enhance the quality of water purification.

Water purification systems in general are well-known in the art of the type having a reverse osmosis (RO) unit or membrane for converting an incoming supply of ordinary tap or feed water into relatively purified water. In general, a reverse osmosis unit may include a semi-permeable RO membrane over which tap water supply passes, such that the membrane acts essentially as a filter to remove dissolved metallic ions and other contaminants and undesired particulate matter from the tap water. Normally, these removed impurities are concentrated in a separate water flow, commonly referred to as retentate or brine, which may be discharged to a drain as waste. The thus-produced flow of relatively purified water is available for immediate dispensing for use and/or for temporary storage within a suitable reservoir or vessel waiting dispensing for use. While the specific construction and operation of such RO water purification systems may vary, such systems are exemplified by those shown and described in U.S. Pat. Nos. 4,585,554; 4,595,497; 4,657,674; and 5,045,197.

One disadvantage associated with water purification systems that include RO membranes and/or other types of catalyst pre-filters is that the impurities can concentrate along the RO membranes or the particulate catalyst media can clump together and lead to undesirable channeling. In terms of the RO filter, concentration or accumulation of impurities on the RO membranes results in decreased performance and a shortened service life. Likewise, catalyst particulate media exposed to tap water or relatively unfiltered water for extended durations as a result of channeling will more quickly lose its filtering effectiveness. Typically, water filtration devices include some sort of sensor to measure the level of particulate matter in the water filtration conduits, which can indicate earlier than desired replacement when the filtration equipment (e.g., the RO membranes and/or particulate catalyst media) lose filtering effectiveness as a result of the above-mentioned conditions. For example, some water purification systems include a monitor circuit coupled to a pair of electrodes for respectively taking conductivity readings of the untreated tap water inflow and the produced purified water (or at other positions along the various water flow paths). The conductivity readings reflect the presence of dissolved solids in the monitored water supplies, whereby a comparison between the conductivity of the untreated tap water versus the produced purified water represents an indication of the performance efficiency of the RO membrane and/or catalyst pre-filter cartridge. When the detected conductivity ratio indicates inadequate purification of the water, such a water purification system may signal the time for replacing the RO cartridge and/or particulate catalyst media. Current known systems require such replacement on a fairly frequency basis of about every six months to a year. Accordingly, this drives up the cost of owning and utilizing such water filtration equipment. As a result, many residential and commercial water customers have favored use of bottled water as a purified water source, despite the costs and inconveniences associated with delivery, storage and changeover of large (typically 5 gallon) water bottles with respect to a bottled water cooler.

There exists, therefore, a significant need in the art for further improvements in and to water purification systems, and specifically for actively vibrating particulate catalyst filter media contained in a catalyst pre- or post-membrane filter to beneficially extend service life and filtration effectiveness by preventing clumping and channeling therein during times of relatively slow tap water inflow. Such improvements may further include a flush flow activation chamber for substantially stirring and agitating to abrade and refresh the particulate catalyst media, and for removing impurities off the RO membranes, thereby significantly extending service life. The present invention fulfills these needs and provided further related advantages.

SUMMARY OF THE INVENTION

The water purification system disclosed herein is for flow-coupled installation with a tap water inflow to produce a relatively purified water outflow. In this respect, the water purification system preferably includes a purification unit having a tap water inlet port for receiving the tap water inflow and a purified water outlet port for dispensing purified water outflow from the purification unit. A particulate catalyst retained within the purification unit catalyzes contaminants as the tap water inflow travels through the purification unit. To prevent channeling during relatively slow tap water inflow through the purification unit, a particulate agitator translates vibratory waves to the purification unit such that the particulate catalyst inside does not stick or clump together.

In one embodiment, the particulate agitator may include a mechanical agitator configured to intermittently contact a portion of the purification unit. Such contact generates vibrations that translate to the particulate catalyst inside. More specifically, the mechanical agitator may include a multi-axial movable base having a slot therein sized for selective reception of an extension protruding outwardly from the purification unit. Here, base movement causes the slot sidewalls to intermittently contact the extension, thereby generating vibratory waves that translate to the particulate catalyst. In an alternative form of this mechanical agitator, the base may include a magnet in a partial magnetic repulsion position relative to another magnet associated with the purification unit. Here, movement of the base and magnet translates reciprocal vibrational movement to the purification unit through magnetic repulsion of the first magnet relative to the second magnet.

In an alternative embodiment, the particulate agitator may include an electrically induced base in vibration coupled relation with the purification unit. Here, the electrically induced base may include a mains power source coupler for converting current into vibratory waves translatable to the purification unit, and specifically to the particulate catalyst to prevent grouping or clumping therein during times of relatively slow tap water inflow. Similarly, the base may include a slot generally configured for slide fit reception of an extension protruding out from the purification unit. The extension preferably snugly fits within the slot so that the vibratory waves generated by the electrically induced base are efficiently transferred or translated to the purification unit and particulate catalyst inside.

In an alternative embodiment, the particulate agitator may include a spring positioned relative to the purification unit to translate axial vibrational energy to the particulate catalyst. Preferably, the spring comprises a coil spring concentrically positioned around an extension or other mount formed as part of the purification unit such that compression and/or extension of the spring about this extension or mount intermittently translates energy to the purification unit. To this end, the spring has the same vibrational effect on the particulate catalyst inside the purification unit to prevent channeling. Additionally, the particulate agitator may include a sound generator. In this embodiment, the sound generator produces sound waves that translate to the purification unit to prevent clumping of the particulate catalyst.

The purification unit may also include a particulate catalyst cartridge housing having a pair of upper and lower filter screens therein generally forming a catalyst cleansing chamber therebetween. This catalyst cleansing chamber catalyzes the tap water inflow as it travels through the purification unit and receives the translated vibrations from the particulate agitator.

Moreover, the purification unit may also include an RO filter having an RO membrane for separating relatively unfiltered water flow into purified water outflow and a brine water outflow having impurities concentrated therein and discharged from the purification unit through a brine water outflow port. In this embodiment, a flush flow activation chamber may be fluidly coupled to the brine water outflow and have a plunger therein for substantially occluding brine water outflow through the brine water outflow port when in a first seated position, and for substantially permitting brine water outflow through said brine water outflow port when in a second unseated position. In this regard, the activation chamber generates back pressure within the water purification system to flash flow tap water inflow into the purification unit and through the particulate catalyst and RO membrane when the plunger moves from the first seated position to the second unseated position. This flush flow or flash flow substantially agitates the particulate catalyst and refreshes the RO membrane by, in a sense, causing a rush of water flow over the filtration equipment as might be accomplished through a pressurized water spray or jet.

The plunger itself may have an elongated cylindrical body with a substantially frusto-conical head sized for at least partial insertion into a seat in the activation chamber. The frusto-conical head may include a channel that permits dispensing a relatively small quantity of brine water out through the brine water outflow port when the plunger is the seated position. Alternatively, the plunger may include a float such that the flush flow is activated by pulling the plunger down and away from seated reception within the seat due to the backpressure within the purification system while dispensing relatively purified water out therefrom. The plunger may also include an outwardly extending or protruding fin designed to at least partially increase fluid turbulence or resistance in and around the plunger and activation chamber sidewalls to increase the activation back pressure required to dislodge the plunger from seated engagement. Increased back pressure corresponds with a higher or stronger flush flow when the plunger does release from its seated position within the activation chamber.

Such a water purification system could be integrated or mounted to a water dispensing system having a cabinet with a hot water faucet and a cold water faucet fluidly coupled to the purified water outlet port. The water purification system could produce relatively purified or filtered water for on-demand dispensing through one or both of the hot or cold water faucets, or for filling a purified or filtered water reservoir housed by the cabinet.

In another aspect, the water purification system may include an active vibration system for use with a system in flow-coupled installation with a tap water inflow that produces a relatively purified water outflow using a purification unit having a tap water inlet port for receiving tap water inflow and a purified water outlet port for dispensing purified water outflow from the purification unit. A particulate catalyst retained within the purification unit is preferably in flow through relation relative to the tap water inflow and purified water outflow to catalyze contaminants as the tap water travels therethrough. In this embodiment, the water purification system includes a mechanical agitator configured to intermittently contact a portion of the purification unit to translate vibrations to the particulate catalyst for substantially preventing channeling thereof during relatively slow tap water inflow through the purification unit. A particulate catalyst cartridge houses the particulate catalyst between an upper filter screen and a lower filter screen to generally form a catalyst cleansing chamber therebetween for receiving translated vibrations from the mechanical agitator.

More specifically, the particulate catalyst cartridge housing is preferably used in connection with a mechanical agitator that includes a multi-axial movable base having a slot therein sized for selective reception of an extension protruding outwardly from the catalyst cartridge. In this respect, the base intermittently moves to contact the extension with the slot sidewalls. Alternatively, such a mechanical agitator may include a first magnet in partial magnetic repulsion relative to a second magnet coupled to the catalyst cartridge. Movement of the mechanical agitator and first magnet translates reciprocal vibrational movement to said catalyst from magnetic repulsion movement of the second magnet in the catalyst cartridge.

Another embodiment disclosed herein includes a water purification system for flow-coupled installation with a tap water inflow for producing a relatively purified water outflow, including a purification unit having a tap water inlet port for receiving tap water inflow and a purified water outlet port for dispensing purified water outflow from the purification unit. A particulate catalyst retained within the purification unit permits tap water inflow to flow therethrough for catalyzing contaminants in the tap water inflow. A particulate agitator that includes a movable first magnet in at least partial magnetic repulsion relation relative to a second magnet associated with the purification unit allows the first magnet to translate reciprocal vibrational movement to the purification unit through magnetic repulsion relative to the second magnet, thereby substantially preventing channeling of the particulate catalyst during relatively slow tap water inflow through said purification unit. An RO filter having an RO membrane may separate relatively unfiltered water flow into purified water outflow and a brine water outflow having impurities concentrated therein and discharged from the purification unit through a brine water outflow port. Moreover, this embodiment may further include a flush flow activation chamber fluidly coupled to the brine water outflow and having a plunger therein for substantially occluding the brine water outflow port when in a first seated position, and substantially permitting brine water outflow through the brine water outflow port when in a second unseated position.

In another alternative embodiment, the water purification system for flow-coupled installation with a tap water inflow for producing a relatively purified water outflow includes the aforementioned purification unit having a tap water inlet port for receiving tap water inflow and a purified water outlet port for dispensing purified water outflow from said purification unit. A particulate catalyst retained within the purification unit is in flow through relation relative to the tap water inflow and purified water outflow, and catalyzes contaminants as the tap water inflow travels through the purification unit. Furthermore, an electrically induced base is in translational vibrational relation relative to the purification unit through respective coupling of a receptacle and extension for substantially preventing channeling of the particulate catalyst during relatively slow tap water inflow through the purification unit. Here, the electrically induced base may include a mains power source coupler for converting current into vibrations translatable to the purification unit and particulate catalyst. More specifically, the particulate catalyst may be housed in a cartridge housing having a pair of upper and lower filter screens therein and generally forming a catalyst cleansing chamber therebetween for receiving the translated vibrations from the electrically induced base. Such a water purification system may couple to a water dispensing system having a cabinet with a hot water faucet and a cold water faucet fluidly for receiving relatively filtered or purified water through the purified water outlet port.

In another embodiment of the water purification system for flow-coupled installation with a tap water inflow for producing a relatively purified water outflow, the system includes a purification unit having a tap water inlet port for receiving tap water inflow and a purified water outlet port for dispensing purified water outflow. A particulate catalyst is retained within a particulate catalyst cartridge housing having a pair of upper and lower filter screens therein generally forming a catalyst cleansing chamber therebetween. Tap water inflow enters the particulate catalyst cartridge housing for flow through interaction with the particulate catalyst in the cleansing chamber. The particulate catalyst is designed to purify or filter the tap water through catalyzing contaminants therein. In this embodiment, a sound wave generator associated with the purification unit and/or cartridge housing may translate vibrations thereto for substantially preventing channeling of the particulate catalyst during relatively slow tap water inflow through the purification unit.

In another alternative embodiment, the water purification system for flow-coupled installation with a tap water inflow for producing a relatively purified water outflow includes a purification unit having a tap water inlet port for receiving tap water inflow and a purified water outlet port for dispensing purified water outflow therefrom. In this embodiment, a particulate catalyst is retained within the purification unit and in flow-coupled relation with the tap water inflow and purified water outflow for catalyzing contaminants in the tap water inflow. A spring associated therewith translates axial vibrational energy to the particulate catalyst for substantially preventing channeling therein during relatively slow tap water inflow through the purification unit. The particulate catalyst cartridge housing preferably includes a pair of upper and lower filter screens therein generally forming a catalyst cleansing chamber for receiving translated vibrations from the spring.

In another embodiment, the water purification system disclosed herein is designed for flow-coupled installation with a tap water inflow for producing a relatively purified water outflow, and includes a purification unit having a tap water inlet port for receiving tap water inflow and a purified water outlet port for dispensing purified water outflow. The water purification further includes a particulate catalyst retained within the purification unit and is in flow through relation relative to the tap water inflow and purified water outflow. The catalyst particulate facilitates removal of contaminants in the tap water inflow before dispensing as relatively purified water outflow. An electrically induced base in vibration coupled relation with the purification unit may translate vibrations to the particulate catalyst to substantially prevent channeling therein during relatively slow tap water inflow through the purification unit. This embodiment also includes an RO filter having an RO membrane for separating relatively unfiltered water flow into purified water outflow and a brine water outflow having impurities concentrated therein for discharge from the purification unit through a brine water outflow port. A flush flow activation chamber fluidly couples to the brine water outflow and has a plunger therein for substantially occluding the brine water outflow port when in a first seated position, and substantially permits brine water outflow through the brine water outflow port when in a second unseated position.

The activation chamber preferably generates back pressure within the water purification system to flash flow the tap water inflow into the purification unit and through the particulate catalyst and RO membrane when the plunger moves between being seated and unseated. Release of the back pressure and the time limited flash flow of tap water inflow substantially agitates the particulate catalyst and refreshes the RO membrane. The plunger preferably includes an elongated cylindrical body having a substantially frusto-conical head sized for partial insertion into a seat in the activation chamber. The plunger may either be designed as a sink or a float, and the frusto-conical head may permit brine water outflow through the brine water outflow port when said plunger is in the seated position. To increase the activation back pressure, the plunger may further include a fin at least partially increasing fluid turbulence within the activation chamber. This water purification system may also mount to a water dispensing system having a cabinet with a hot water faucet and a cold water faucet. Preferably, the faucets fluidly couple to the purified water outlet port, or a water reservoir coupled to the purified water outlet port.

In another alternative embodiment, the water purification system is configured for flow-coupled installation with a tap water inflow for producing a relatively purified water outflow for use in a water dispensing system having a cabinet with a hot water faucet and a cold water faucet fluidly coupled to the purified water outflow. The water dispensing system includes a purification unit having a tap water inlet port for receiving tap water inflow and a purified water outlet port for dispensing purified water outflow from the purification unit. The water dispensing system further includes a particulate catalyst cartridge housing having an upper filter screen and a lower filter screen generally forming a catalyst cleansing chamber therebetween. A particulate catalyst within the particulate catalyst housing is in flow through relation relative to the tap water inflow and purified water outflow, for catalyzing contaminants as said tap water inflow travels through the purification unit. This water purification system may include a mechanical particulate agitator that includes a multi-axial movable base having a slot therein sized for selective reception of an extension protruding outwardly from the purification unit, the base being movable to intermittently contact the extension with the slot sidewalls to translate vibrations to the particulate catalyst cartridge housing for substantially preventing channeling of the particulate catalyst during relatively slow tap water inflow through the purification unit. An activation chamber generates back pressure within the water purification system to flash flow tap water inflow into the purification unit and through the particulate catalyst when a float moves from a first seated position to a second unseated position, thereby substantially agitating the particulate catalyst.

In this embodiment, the mechanical agitator may also include a first magnet in an at least a partial magnetic repulsion position relative to a second magnet integrated into the catalyst cartridge, such that movement of the mechanical agitator translates reciprocal vibrational movement to the catalyst cartridge through magnetic repulsion of the first magnet relative to the second magnet. Furthermore, the float may include one or more fins formed along an elongated cylindrical body for at least partially increasing fluid turbulence within the activation chamber for increasing the activation back pressure. The float may also include a substantially frusto-conical head sized for partial nested reception into a seat in the activation chamber; the frusto-conical head may include a channel that permits brine water outflow through the brine water outflow port when the float is in said first seated position.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 3 is a partial exploded and enlarged perspective view more specifically illustrating the internal arrangement of the pre-filter cartridge and related catalyst filter elements;

FIG. 4 is a partial exploded and enlarged perspective view more specifically illustrating the internal arrangement of the RO water filtration cartridge and related RO filter elements;

FIG. 5 is a cross-sectional view of the pre-filter cartridge, taken generally about the line 5-5 in FIG. 2, further illustrating internal flow of tap water through a water purifying particulate-based medium;

FIG. 6 is an enlarged cross-sectional cut-away of the pre-filter cartridge of FIG. 5 taken about the circle 6, further illustrating a mechanically movable base in vibration coupled relation with the pre-filter cartridge;

FIG. 7A is an enlarged cross-sectional cut-away of the pre-filter cartridge of FIG. 5 taken about the circle 7, further illustrating an electrically activated vibration coupled relation with the pre-filter cartridge;

FIG. 7B is an enlarged cross-sectional cut-away of the pre-filter cartridge of FIG. 5 taken about the circle 7, further illustrating first and second magnets in magnetic repulsion to create vibration coupled relation with the pre-filter cartridge.

FIG. 8 is an enlarged cross-sectional cut-away of the pre-filter cartridge of FIG. 5 taken about the circle 8, further illustrating a spring actuated base positioned to translate spring-generated vibrational energy to the pre-filter cartridge;

FIG. 11 is a cross-sectional view of the flush flow activation chamber taken about the line 11-11 in FIG. 2, illustrating a plunger in a seated position substantially occluding brine water outflow;

FIG. 11A is an enlarged perspective view of the plunger or a float, including a frusto-conical nose having a channel therein for bleeding brine water outflow when in a nested or seated position in the flush flow activation chamber;

FIG. 12 is an alternative cross-sectional view similar to FIG. 11, illustrating movement of the plunger from a seated position to an unseated position substantially permitting brine water outflow;

FIG. 13 is an alternative cross-sectional view similar to FIGS. 11 and 12, further illustrating movement of the plunger from the unseated position to reengage in a seated position within the flush flow chamber again occluding brine water outflow;

DETAILED DESCRIPTION OF THE PREFERRED EMBODIMENTS

Figure 2:
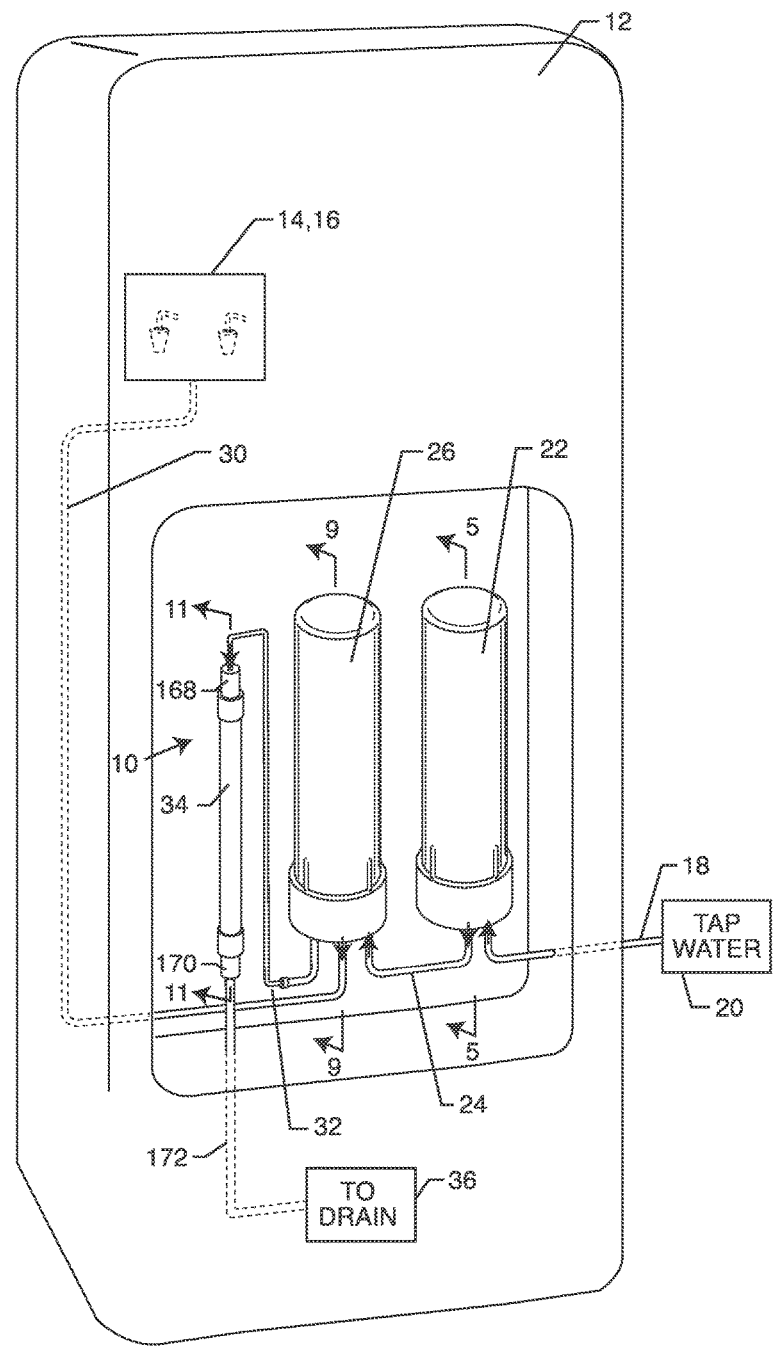
FIG. 2 is an enlarged perspective view illustrating one arrangement of the active vibration water purification system mounted behind the water dispensing system of FIG. 1, generally illustrating inclusion of a pre-filter cartridge, a reverse osmosis (RO) water filtration cartridge and a flush flow chamber.

As shown in the drawings for purposes of illustration, the present disclosure for a water purification system with active vibration is referred to generally as reference numeral 10 in FIG. 2. In general, the water purification system 10 disclosed herein is designed to provide improved filtration characteristics while at the same time significantly extending the operational lifetime of systems that use particulate-based water filtration devices and/or reverse osmosis (RO) cartridges, and the like. In this respect, the water filtration system 10 may include a mechanism for vibrating the particulate-based water filtration cartridge and/or the RO membrane before, during or after pure water production. Furthermore, such a water filtration system 10 may also flush the particulate and/or RO water filtration cartridges at selected intervals. Such mechanisms can prevent bunching, clumping or grouping of particulate matter that can result from relatively slow water flow therethrough to reduce or eliminate channeling therein, which can otherwise lead to premature exhaustion of the catalyst material and early cartridge replacement. Similarly, such mechanisms can reenergize an RO filter by preventing build-up of waste particulate on the RO membrane, thereby beneficially extending its operational lifetime.

Figure 1:
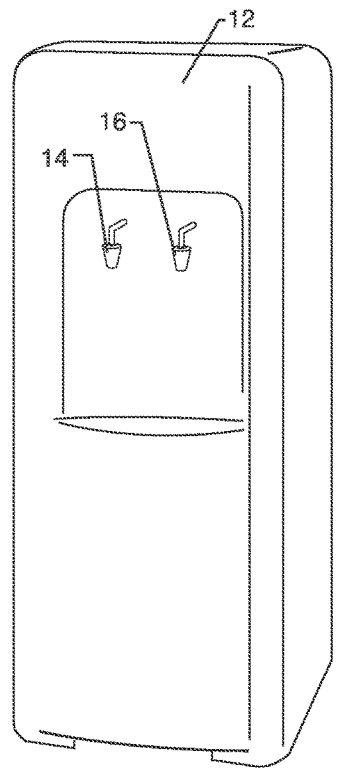
FIG. 1 is a general perspective view of a water dispensing system having a cold water faucet and a hot water faucet capable of being integrated with the active vibration water purification system embodying the novel features of the present invention.

The water purification system 10 described herein may be integrated into, for example, a water dispensing system 12 as shown in FIG. 1, having both a cold water faucet 14 and a hot water faucet 16. As shown in more detail in FIG. 2, such a water purification system 10 may mount to the exterior of the water dispensing system 12, with a tap water inlet line 18 coupled to a tap water inlet 20. From a general standpoint, unfiltered tap water preferably first enters a particulate filtration cartridge 22 via the tap water inlet line 18 for initial filtering. Filtered water exits the particulate filtration cartridge 22 through a filtered water line 24 and may be routed next to a reverse osmosis (RO) filtration cartridge 26 as shown in FIG. 2, or the filtered water may be routed directly to the dispensing system, such as the cold water faucet 14 or the hot water faucet 16 shown in FIG. 1 for on-demand consumption. In particular with respect to the embodiment shown in FIG. 2, the RO filtration cartridge 26 includes a series of RO membranes 28 (FIG. 11) for separating the filtered water inflow into relatively a purified water outflow line 30 available for on-demand dispensing, as described above, and a retentate or brine outflow line 32 having contaminants and impurities substantially concentrated therein. The brine is routed through a flush flow chamber 34 and eventually discarded to a drain 36. Preferably, the particulate filtration cartridge 22 filters the tap water inflow from the inlet 20 to catalyze chemical contaminants which would otherwise be harmful to the RO membranes 28, thereby significantly increasing the service life of the RO membranes 28. A particulate catalyst 38 within the particulate filtration cartridge 22 is preferably continuously vibrated and, in some embodiments, may be periodically refreshed to achieve extended service life compatible with the extended service life of the RO membranes 28.

A person of ordinary skill in the art will readily recognize that the illustrative water purification system 10 may be deployed for other uses, and not simply limited in scope and content to the water dispensing system 12 shown in FIG. 1. For example, the water purification system 10 could be used in refrigerators or kitchen sink-based water systems to provide a ready supply of substantially purified water for drinking and/or cooking purposes. The water purification system 10 may be used in residences (e.g., houses, apartments, condos or townhomes), or for commercial use such as in an industrial environment (e.g., a machine shop) or office environment. In this respect, the water purification system 10 could be installed behind the portable water dispensing system 12, or within the cabinet space underneath a kitchen-type sink (not shown).

The water dispensing system 12 may couple the purified outflow line 30 (or the filtered water line 24 when an RO filtration cartridge is not present) to a cold water circuit (not shown) to which the cold water faucet 16 is connected and a water heater (also not shown) and hot water circuit to which the hot water faucet 16 is connected. Persons skilled in the art will appreciate that the cold and hot water circuits are well known in the art for cooling or heating the filtered or purified water before being dispensed out the respective faucets 14, 16. Additionally, persons skilled in the art will recognize that the water purification system 10 described herein could also be used with a single-handle faucet set that can be used for dispensing cold water, hot water, or a tempered mixture thereof.

During normal operation, tap water inflow passes through the particulate filtration cartridge 22 for treatment before delivery for on-demand dispensing out one or both of the cold or hot water faucets 14, 16, or before delivery to the RO filtration cartridge 26 for purposes of further purification by passing the filtered water through the RO membranes 28 contained therein. In this respect, the RO membranes 28 separate the tap water inflow into the produced relatively purified water outflow and the retentate or brine outflow, which may be discarded to the drain 36 via the brine outflow line 32 coupled to the flush flow chamber 34. In one alternative to delivery for on-demand dispensing, filtered or purified water may be delivered to a storage reservoir (not shown) where it is stored and later available for on-demand dispensing.

In this regard, persons skilled in the art will recognize and appreciate that the purified water in the purified outflow line 30 has impurities substantially removed therefrom, whereas these removed impurities are retained within and carried off by the retentate or brine flow in the brine outflow line 32 for eventually being discarded from the system 10. While the term brine is commonly used to refer to this retentate flow, persons skilled in the art will also understand that the level of impurities carried by this brine flow does not render the water toxic or harmful for a wide range of traditional domestic water supply uses such as washing, bathing, etc. Indeed, if this retentate or brine flow is intermixed with other water within the water supply system, the proportional increase in overall impurities is virtually unnoticeable.

FIGS. 3 and 4 more specifically illustrate the internal components of the particulate filtration cartridge 22 and the RO filtration cartridge 26, respectively. Specifically with respect to FIGS. 3 and 5-8, the particulate filtration cartridge 22 includes a tap water inlet port 40 for receiving tap water inflow from the tap water inlet 20 via the tap water inlet line 18. Tap water entering the particulate filtration cartridge 22 through the tap water inlet port 40 enters into a space or chamber 42 (FIGS. 5-8) formed beneath a lower catalyst filter element 44 having a pair of flow apertures 46 therein covered by a filter or screen 48 that permits purified water flow therethrough while preventing the particulate catalyst media 38 from exiting the particulate filtration cartridge 22 through the flow apertures 46. Additionally, an upper catalyst filter element 50 having a similar filter or screen 52 permits tap water flow out from a catalyst cleansing chamber 54 formed between these two filter elements 44, 50 into a headspace 56 (FIG. 5). The lower and upper screens 48, 52 may also be adapted to trap additional particulate contaminants, preferably to a size of about 5 microns, before allowing filtered tap water to exit the catalyst cleaning chamber 54. This catalyst cleansing chamber 54 is at least partially filled (preferably less than ½ the chamber volume) with the particulate catalyst media or agent 38 such as zinc or the like such as a copper-zinc catalyst mixture. The particulate catalyst media or agent 38 treats the tap water inflow in a manner to effectively catalyze chemical contaminants know to be harmful and/or that significantly reduce the service life of the RO membranes 28 within the RO filtration cartridge 26. Such chemical contaminants commonly include chlorines and chloramines present in domestic water supplies. A portion of the catalyst zinc dissolves into the tap water flow passing through the particulate filtration cartridge 22.

As shown in the cross-sectional views of FIGS. 5-8, the particulate filtration cartridge 22 generally includes an upright housing 58 having, in a preferred embodiment, a generally cylindrical cross sectional shape configured to retain the particulate catalyst media 38 therein. This upright housing 58 includes a series of external threads (not shown)

that rotatably engage by threaded engagement a series of internal threads 60 formed as part of a particulate cartridge carrier 62 (FIG. 3). Threaded engagement of the upright housing 58 to the particulate cartridge carrier 62 preferably produces an air and water-tight seal to prevent leakage during normal operation of the water purification system 10. In this respect, in one embodiment, the threads may include a sealant to prevent such leakage. Although, it is preferred that the threads provide sealing engagement without the use of a sealant or other chemicals. Accordingly, during non-use and in particular when the particulate filtration cartridge 22 needs servicing due to exhaustion of the catalyst material therein, the upright housing 58 may be unscrewed from the particulate cartridge carrier 62 to gain access to the water filtration equipment inside, and in particular the particulate catalyst 38. Thus, the particulate filtration cartridge 22 is preferably removable from the water filtration equipment, such as the water dispensing system 12, and returnable to the manufacturer to have the catalyst particulate matter removed and replaced or recharged.

In operation, the lower catalyst filter element 44 is slidably received within the interior of the particulate cartridge carrier 62 and is sealed thereto by a pair of o-rings 64, 64' (FIG. 3). Tap water from the tap water inlet line 18 travels through the inlet port 40 and up underneath the lower catalyst filter element 44 for entry into the catalyst cleansing chamber 54 through the flow apertures 46 and the lower screens 48. Tap water flows upwardly into and through this catalyst cleansing chamber 54 where it mixes with the particulate catalyst 38. Typically the particulate catalyst 38 is in the form of a settled bed occupying up to about ½ the volume of the catalyst cleansing chamber 54 and may include, in a preferred form, a metal-based particulate including copper and zinc components. One preferred catalyst material for use with the water filtration system 10 described herein is available from KDF Fluid Treatment, Inc., of Constantine, Mich., under product designation KDF-55. See also U.S. Pat. No. 5,135,654, which is herein incorporated by reference. Tap water flowing up through the particulate bed of the catalyst media 38 results in stirring and fluidizing of the media 38 (e.g., as shown in FIG. 5). Filtered water exits the catalyst cleansing chamber 54 through the upper screens 52 for eventual travel back through the center of the cartridge 22 in a hollow central stem 64 having a crowned head 66. The filtered water discharges the particulate filtration cartridge 22 through an outlet 68 for travel in the filtered water line 24 to a filtered water inlet port 72 (best shown in FIG. 9) as part of the RO filtration cartridge 26, or for use by the water dispensing system 12.

During normal filtered water production, with either the cold water faucet 14 or the hot water faucet 16 in a normally closed position, the tap water inflow may proceed through the particulate filtration cartridge 22 at a relatively slow flow rate. The flow rate may be one that causes little or no disturbance or disruption in the settled catalyst bed. As a result, the water-catalyst contact or residence time may not be ideal, and otherwise could be insufficient for substantially thoroughly catalyzing the chemical contaminants, such as by oxidation reduction reaction. Particulate contaminants not trapped within the catalyst bed may flow out through the particulate catalyst cartridge 22 at higher than desired quantities or concentrations in the filtered water, despite the fact that the particulate catalyst media 38 may not be completely used. Insufficient disruption of the particulate catalyst media 38 consequently may result in channeling, where tap water flows through channels of media 38 constantly exposed to tap water flow.

Excessive channeling over extended durations could prevent the particulate catalyst 38 from effectively catalyzing chlorine-based chemical contaminants of the type commonly present in many domestic water supply systems for sanitizing the water supply. As a result, since such constituents can be harmful to the semi-permeable membranes 28 of the type used in the RO filtration cartridge 26 for pure water production, effective use of the catalyst 38 can dramatically increase membrane service life. Such catalyzation is accompanied by an oxidation reduction reaction which results in an oxidation layer on the catalyst particles. Over time, this oxidation layer can obstruct or interfere with water-catalyst contact. Accordingly, the effectiveness of the particulate catalyst 38 can be significantly diminished if not refreshed, especially if the catalyst 38 is allowed to clump and form channels. To avoid this reduction in catalyst effectiveness, the particulate catalyst 38 is preferably regularly renewed or refreshed by removing the oxidation surface layer therefrom and flushing this removed oxidation layer and any trapped particulate contaminants from the particulate filtration cartridge 22.

Figure 10:
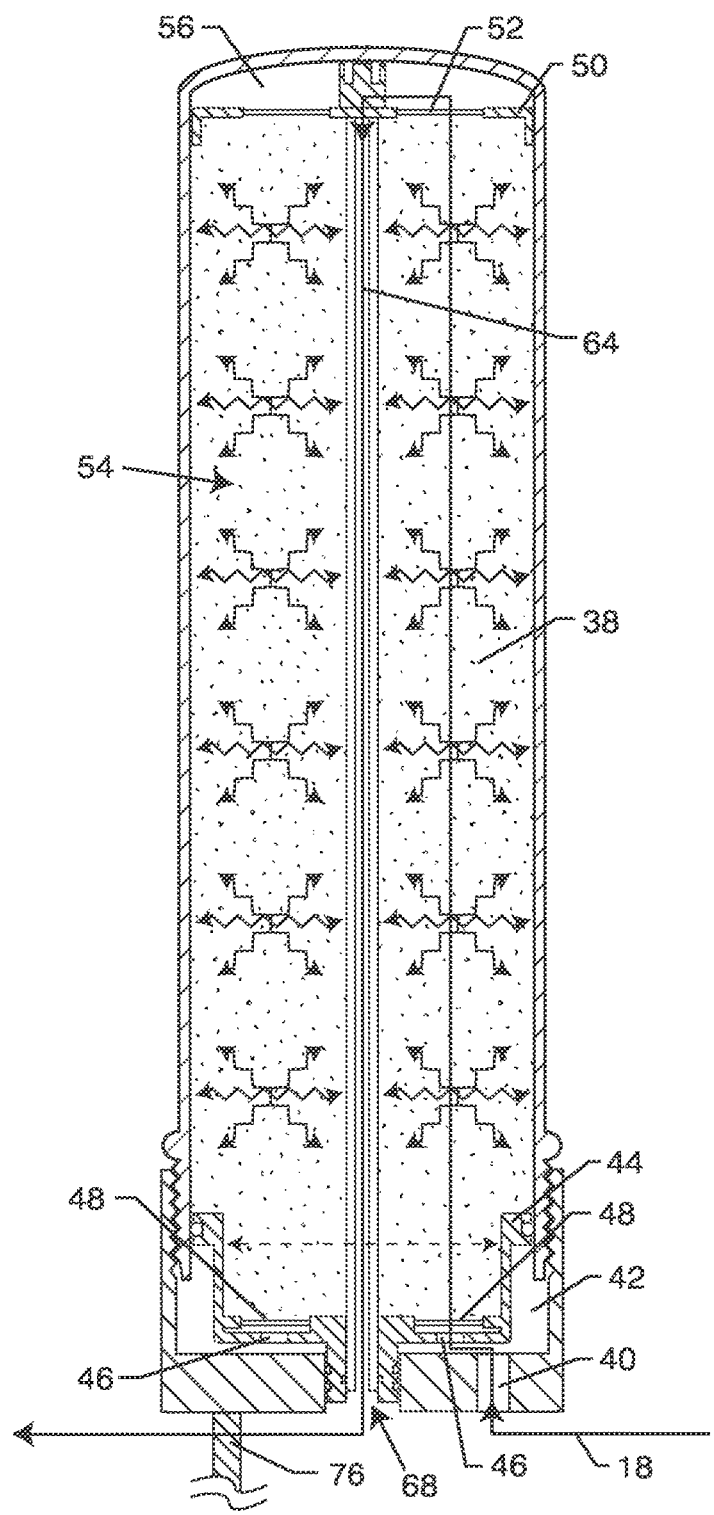
FIG. 10 is an alternative cross-sectional view of the pre-filter cartridge of FIG. 5, illustrating flush flowing the particulate matter therein through activation of the flush flow chamber.

In one embodiment, the system 10 prevents clumping and/or channeling of the particulate catalyst media 38 by coupling the particulate filtration cartridge 22 to a particulate agitator 76, as generally shown in FIGS. 3, 5 and 10 and described more specifically below with respect to FIGS. 6-8. For example, FIG. 6 illustrates one vibrating mechanism in the form of a mechanical shake 78 that includes a movable base or body 80 in mechanical contact with the particulate filtration cartridge 22, such as by an extension 82 protruding out from a base portion of the particulate cartridge carrier 62. In this embodiment, the mechanical shake 78 includes an indentation or slot 84 that at least partially receives a portion of the extension 82 therein. The mechanical shake 78 moves or vibrates the particulate carrier cartridge 22 through a variety of movements that may include vertical, horizontal or angled movement, or a combination of thereof. The body 80 may move in this respect to intermittently contact or jostle the particulate cartridge carrier 22, such as by the extension 82, to periodically disrupt settlement of the particulate media 38 by translating vibrational contact between the surfaces of the body 80 and the particulate cartridge carrier 62 to the particulate catalyst media 38 in the particulate filtration cartridge 22.

Alternatively, translation of vibratory waves may be accomplished through the use of an electric shake 86, as shown in FIG. 7. Here, the electric shake 86 may include a coupler that connects to a mains power supply (not shown). Electrical current delivered to the body 80 via this coupler is converted into vibratory waves that emanate from the body 80. These waves eventually translate to the particulate catalyst media 38 within the particulate filtration cartridge 22 to effectively prevent clumping and channeling. To more effectively translate said waves in this embodiment, the slot 84 may be sized to snugly slidably receive the extension 82. In this respect, increased material contact increases the surface area over which the waves can translate, thereby increasing the efficiency at which said waves travel from the body 80 and into contact with the particulate catalyst media 38. Moreover, the slot 84 and the extension 82 may be made from materials designed to further or enhance vibratory wave translation (e.g., through resonance) to the particulate catalyst media 38. Although, even small perturbations of the particulate media 38 should effectively prevent clumping and channeling during periods of low flow of tap water through the particulate filtration cartridge 22.

Alternatively, translation of vibratory waves may be accomplished through the use of magnetic repulsion, as illustrated in FIG. 7B. Here, a first magnet 81 may include a coupler that connects to a mains power supply (not shown). Electrical current delivered to the first magnet 81 via this coupler may create a magnetic polarity that alternates and interacts with a second magnet 63 of the purification unit. At least a partial magnetic repulsion position of the first magnet 81 relative to the second magnet 63 translates reciprocal vibrational movement to the purification unit converted into vibratory waves that emanate from the first magnet 81. These waves eventually translate to the particulate catalyst media 38 within the particulate filtration cartridge 22 to effectively prevent clumping and channelling. To more effectively translate said waves in this embodiment, the slot 84 may be sized to snugly slidably receive the extension 82. In this respect, increased material contact increases the surface area over which the waves can translate, thereby increasing the efficiently at which said waves travel from the body 80 and into contact with the particulate catalyst media 38. Moreover, the slot 84 and the extension 82 may be made from materials designed to further or enhance vibratory wave translation (e.g. through resonance) to the particulate catalyst media 38. Although, even small perturbations of the particulate media 38 should effectively prevent clumping and channelling during periods of low flow of tap water through the particulate filtration cartridge 22.

In another embodiment as shown in FIG. 8, a spring 88 may be used to vibrate or move the particulate cartridge carrier 62 to accomplish the same or similar vibratory movement of the particulate catalyst 38. Here, compression and/or expansion of the spring 88 may generate vibratory waves transmittable to the particulate cartridge carrier 62, or may move or jostle the particulate cartridge carrier 62 itself to disrupt complete settlement of the particulate catalyst media 38. In the embodiment shown with respect to FIG. 8, the spring 88 resides substantially concentrically on the extension 82 and remains sandwiched between the particulate cartridge carrier 62 and the base 80. One end of the spring 88 may reside within the slot 84 to provide positional stability when the base 80 moves the spring 88 between compressed and extended positions. That is, the base compresses the spring 88 by moving upwardly and the spring 88 expands back to an extended position when the base moves downwardly. Such movement generates translatable waves that cause perturbations of the particulate catalyst media 38, thereby preventing clumping and/or channeling therein, as described above.

Figure 9:
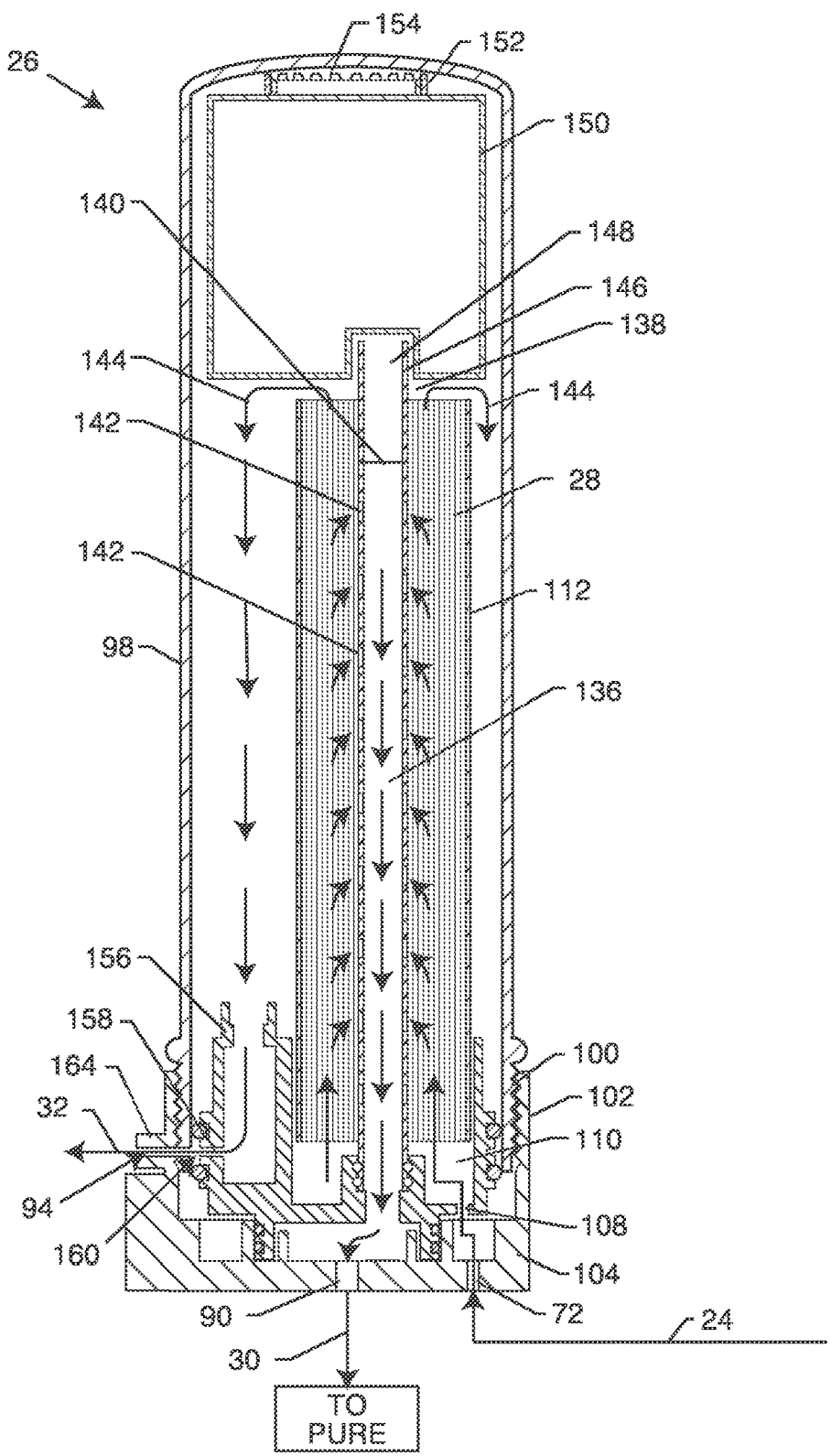
FIG. 9 is a cross-sectional view of the RO cartridge, taken generally about the line 9-9 in FIG. 2, further illustrating internal flow of tap water or purified water through an RO membrane.

Filtered water exiting the particulate filtration cartridge 22 travels through the filtered water line 24 and into the RO filtration cartridge 26 through the filtered water inlet port 72. Here, and as shown in FIG. 9, the RO membranes 28 separate the filtered water inflow into two water outflows, namely, relatively purified water that exists the RO cartridge 26 through a purified water outflow port 90 into the purified outflow line 30, and brine water that exists the cartridge 26 through a brine water outflow port 94 into the brine water outflow line 32. The produced relatively purified water in the purified outflow line 30 may be coupled to a reservoir within the water dispensing system 12 for storage or to one or both of the faucets 14, 16 for on-demand dispensing. As shown in FIG. 9, the RO filtration cartridge 26 generally includes a housing 98 having a generally cylindrical cross sectional shape configured to retain the RO membranes 28 therein. This housing 98 includes a series of external threads 100 that rotatably engage by threaded engagement a series of internal threads 102 formed as part of an RO cartridge carrier 104 (FIG. 4). Threaded engagement of the housing 98 to the RO cartridge carrier 104 preferably produces an air and water-tight seal to prevent leakage during normal operation of the water purification system 10. In this respect, in one embodiment, the threads 100 or 102 may include a sealant to prevent such leakage. Although, preferably, the threads 100, 102 provide water-tight sealing engagement without the use of a sealant or other chemical. Accordingly, during non-use and in particular when the RO membranes 28 need servicing due to exhaustion of the filtration media, the housing 98 may be unscrewed from the RO cartridge carrier 104 to gain access to the water filtration equipment inside. Thus, the RO filtration cartridge 26 is preferably removable from the water filtration equipment, such as the water dispensing system 12, and returnable to the manufacturer for servicing or replacement.

In the embodiments described herein, the RO filtration cartridge 26 further purifies the filtered water from the particulate filtration cartridge 22. In this respect, filtered tap water enters the RO filtration cartridge 26 through the filtered water inlet port 72 and fills a channel 106 (FIG. 4) below an aperture 108 that permits the filtered tap water inflow to enter a space or region 110 immediately below an RO filter 112. As shown in FIG. 4, the RO filter 112 includes a seal 114 having a lower section 116 and an upper section 118 that generally taper outwardly into a point 120. The lower and upper sections 116, 118 effectively increase the outer diameter of the RO filter 112 and provide for a form-fit seal to the inner diameter of a filter port 122 formed from a base unit 124 that couples to the RO cartridge carrier 104. In this respect, a piece of tape 126 may be disposed across a portion of the upper section 116 to retain the seal 114 at a specific location along the length of the RO filter 112. The point 120 of the seal 114 preferably includes an outer diameter somewhat larger than the inner diameter of the filter port 122 such that an air-tight and water-tight seal forms therebetween when the RO filter 112 engages the base unit 124. The seal 114 should be made from a somewhat deformable or flexible material such as rubber so as to permit insertion into the filter port 122.

Furthermore, the RO filter 112 includes a filter coupler 128 having a pair of o-rings 130, 130' thereon for selected air-tight and water tight-reception into a base unit outlet coupler 132. This way, filtered tap water entering the base unit 124 though the aperture 108 is separately maintained within the space/region 110 (FIG. 9) such that the filtered tap water must flow up into the series of membranes 28 in the RO filter 112, thereby purifying the filtered tap water into a substantially pure water flow that concentrates in an RO discharge tube 136 before delivery back to the RO cartridge carrier 104 through the filter coupler 128 and the purified water outflow port 90. Preferably, the RO filter 112 is the CSM RE1812-24 Reverse Osmosis Membrane manufactured by Woongjin Chemical Company of Seoul, Korea, although persons of ordinary skill in the art may recognize that other filters known in the art may be compatible with the water purification system 10 disclosed herein. The RO membranes 28 preferably substantially filter out bacteria, progenies, viruses, pesticides, hydrocarbons, radioactive contaminants, turbidity, colloidal matter, chlorine, detergents, industrial wastes, asbestos, and other dissolved solids such as sodium, calcium, magnesium, sulfates and cadmium. In this respect, the RO membranes 28 are about as thick as cellophane and are semi-permeable, thereby permitting pure water to flow through and otherwise suspending out the dissolved inorganic matter mentioned above. The suspended impurities/contaminants are washed out and exit the RO filter 112 at a top end 138 thereof as brine water.

As shown best in FIG. 9, the RO discharge tube 136 includes a stop 140 that separates the clean water side having a set of perforations 142 therein to permit pure water to exit the RO filter 112, as described above, apart from the brine water side. Brine water outflow, as designated by numeral 144, is allowed to exit the RO filter 112 at the top end 138 thereof because the RO discharge tube 136 includes a standoff 146 extending above the top end 138 for slide fit reception into a complementary fitting 148 formed into a portion of a header 150. In this respect, the standoff 146 is of a length that positions the header 150 at a predefined distance above the top end 138 of the RO filter 112, as shown best in the cross-sectional view of FIG. 9, to permit the brine water outflow 144 to exit the RO filter 112. The stop 140 prevents this brine water outflow 144 from mixing with the pure water outflow in the RO discharge tube 136. The header 150 is also designed to fill the space remaining above the RO filter 112 so the RO water filtration cartridge 26 can house RO filters of various sizes. Furthermore, the header 150 ensures that each component in the RO filtration cartridge 26 remains in adequate engagement to prevent leakage. In this respect, the header 150 includes a somewhat circular extension 152 (FIGS. 4 and 9) having an outside diameter approximately the same size as an inside diameter of a flexible or deformable corrugated spacer 154. In this respect, the spacer 154 may flex about its corrugations to optimally and snugly couple to the circular extension 152 for slide-fit reception thereon, and to snugly bias the filtration assembly within the interior of the carrier cartridge housing 98.

As shown in FIGS. 4 and 9, the base unit 124 includes a drain tube coupler 156 having an exit aperture 158 that extends through the width of the base unit housing 124 and opens into a channel 160 between a pair o-rings 162, 162' in the base unit 124. When the base unit 124 is selectively slidably retained within the RO cartridge carrier 104 and the housing 98, the channel 160 becomes substantially aligned with one or more of the brine water outflow ports 94 (FIG. 9) bored in the side of the housing 98. The channel 160 permits the brine water outflow to travel circumferentially around the exterior of the base unit 124 until brine water can escape therefrom through these ports 94. The brine outflow ports 94 open to a dispense channel 164 formed from the RO cartridge carrier 104 and coupled to the brine water outflow line 32. Thus, brine water flow exiting the RO filter 112 enters the drain tube coupler 156 and passes through the exit aperture 158 in the base unit 124 into the channel 160, and out from the RO filtration cartridge 26 via the dispense channel 164 and the brine outflow line 32 en route to the flush flow chamber 34 (FIG. 2)

In this respect, the operational aspects of the flush flow chamber 34 are shown in more detail in FIGS. 11-18. More specifically, the flush flow chamber 34 generally includes an elongated tube 166 having a flush flow inlet port 168 fluidly coupled to the brine outflow line 32 for receiving the brine water outflow and related impurities substantially concentrated therein, and a flush flow exit port 170 for discharging said brine water outflow to the drain 36, such as through a drain line 172. The tube 166 may be made from a single piece of material, such as plastic or metal, or multiple interconnecting pieces of material, depending on the desired size, shape and configuration. The interior of the tube 166 is of a diameter that permits vertical movement of a plunger or weight 174 (FIGS. 11-15) or a float 176 (FIGS. 16-18), namely in and among the positions generally shown in FIGS. 11-18. The plunger 174 and the float 176 are designed to create a flush flow state or flushing condition that essentially refreshes or reenergizes the filtration equipment, and namely the particulate catalyst 38 in the particulate filtration cartridge 22 and/or the RO membranes 28 in the RO filtration cartridge 26, or other filtration equipment that may be utilized by the system 10 for purposes of water filtration.

In a relatively static state, i.e., when the system 10 is not dispensing water out through either of the faucets 14, 16 or otherwise filling a reservoir (if one is being utilized), the plunger 174 is generally in the position shown in FIG. 11. Here, pressurization within the system 10 during this static state allows the weighted plunger 174 to sink to the bottom of the brine water filled tube 166 for placement or engagement with a seat 178 having an aperture 180 with a diameter narrower than the interior diameter of the tube 166. The aperture 180 permits brine water outflow, but may be substantially occluded by the plunger 174 when in the position shown in FIG. 11. In this respect, the plunger 174 preferably includes a nozzle or nose 182 that generally tapers inwardly from a substantially cylindrical body portion 184, as best shown in FIG. 11A. While the cylindrical body portion 184 is larger in diameter than the aperture 180, the nose portion 182 preferably tapers to a diameter somewhat smaller than the aperture 180 to permit a portion of the nose 182 to slide into and partially penetrate through the aperture 180, thereby substantially occluding brine water flow therethrough.

When in the seated position shown in FIG. 11, the system 10 is in a relatively static state wherein pure water production has ceased, such as when the faucets 14, 16 are closed or when the pure water reservoir or storage vessel (if used) is full. Despite being in a relatively static state, the nose 182 may still permit brine water outflow through the aperture 180 by means of a narrow slot 186 formed as a channel or conduit along the narrowing or tapered portion of the nose 182, as shown best in FIG. 11A. The slot 186 permits metered brine water outflow during this relative static state to prevent the system 10 from becoming completely stagnant after extended durations of little or no water usage. The plunger 174 essentially functions as a flow limiter to prevent substantial outflow of brine water, which beneficially reduces water waste during times of non-use. Of course, a person of ordinary skill in the art will readily recognize that the flush flow chamber 34 will also work with a plunger that excludes the slot 186. In this embodiment, and when the system 10 reaches the substantially static state described above, the plunger fully engages the seat 178 such that the nose 182 preferably entirely occludes flow through the aperture 180, thereby ceasing all water flow out through the flush flow exit port 170 into the drain line 172.

Opening one or both of the faucets 14, 16 to dispense pure water causes the system 10 to reengage in the production of pure water—either to meet on-demand dispensing needs or to refill the reservoir (if one is used). In this condition, the RO filtration cartridge 26 experiences a pressure drop as a result of the increased velocity of water traveling therethrough. That is, dispensing pure water from one or both of the faucets 14, 16 creates a vacuum in the purified outflow line 30, which allows pressurized tap water to inflow into the system 10 through the tap water inlet line 18 to reengage in pure water production. The plunger 174 will remain in seated engagement with the seat 178 until the back pressure at the flush flow inlet port 168 draws the plunger 174 out from engagement therewith. For this to happen, the pressure drop behind the plunger 174 must decrease to some threshold level that draws the weighted plunger 174 out from said seated engagement. A person of ordinary skill in the art will appreciate that there will be some delay between the time when pure water production is reinitialized by opening the faucet(s) 14, 16 and the time when the plunger 174 disengages the seat 178. To this extent, the system 10 experiences an ever increasing back pressure near the flush flow inlet port 168 and when this "vacuum" exceeds the weighted force keeping the plunger 174 engaged with the seat 178, the plunger 174 pulls or pops out from within the aperture 180.

Here, the water purification system 10 experiences a short, yet noticeable change in water pressure and water velocity that reverberates throughout the flow paths in the water purification system 10, and specifically within the particulate filtration cartridge 22 and through the related particulate catalyst 38, and within the RO filtration cartridge 26 and over and through the RO membranes 28. More specifically in this respect, the system 10 experiences a rush of water out from the tube 166 through the now open aperture 180, thereby creating a vacuum (i.e., decreased pressure) therebehind as a result of increased fluid flow velocity. This vacuum consequently results in a sudden increase or flash flush of tap water inflow in through the tap water inlet line 18. This so-called flush flow has the effect of flashing an increased flow of tap or filtered water over the RO filter membranes 28 to effectively dislodge or remove contaminant particulate matter that may have accumulated thereon. In a sense, the flush flow chamber 34 is a built-in self-cleaning device that clears the RO filter membranes 28 of build-up that otherwise may damage the membranes 28 and shorten its service life.

While pure water is being produced, the plunger 174 remains near the top of the tube 166 as shown in FIG. 12 so that brine water outflow may freely exit the tube 166 through the flush flow exit port 170. When pure water dispensing ceases, either by turning off the faucet(s) 14, 16 or by substantially filling the reservoir or storage vessel (if used), pure water production through the RO filter 112 (and related water velocity) decreases, thereby allowing the plunger 174 to sink back down toward engagement with the seat 178 as shown in FIG. 13 as the system 10 pressurizes. So, during non-operation, i.e., when pure water is not being dispensed from the faucets 14, 16 or otherwise filing the reservoir or storage vessel, the desired rate of brine water production through the flush flow chamber 34 is reduced to a minimal amount, i.e., the volume of water through the slot 186, if one is used. In this respect, the plunger 174 preferably falls back down to the position shown in FIGS. 11 and 15 such that the nozzle or nose 182 repositions itself back within the aperture 180 whereby brine water outflow exits the tube 166 only through the channel or slot 186. The flush flow chamber 34 then reactivates the next time one of the faucets 14, 16 are opened.

The characteristics of the tube 166 and the plunger 174 govern the speed, force and duration of the flush flow mechanism described herein. For example, in the embodiment shown in FIGS. 11-13, the plunger 174 generally includes a cylindrical body portion 184 having a tapered frusto-conically shaped nose 182 that includes an angled channel or slot 186 therein that permits a relatively low volume of brine water to flow through the aperture 180 at times of little or no pure water production. Furthermore, the outer diameter of the cylindrical body portion 184 is slightly smaller in diameter relative to the inner diameter of the tube 166. This permits some fluid flow through and around the plunger 174 and has a tendency to require a higher vacuum within the system 10 to dislodge the plunger 174 from the seat 178 than an embodiment wherein the tube 166 has an inner diameter appreciably larger than the outer diameter of the plunger. Although, conversely, the smooth outer diameter of the cylindrical body portion 184 does reduce turbulence along the surface of the plunger 174, thereby relatively reducing the needed back pressure to dislodge the plunger 174 from the seat 178. For example, the plunger 174 may be dislodged from the seat 178 with relatively less force than plunger 174' (FIGS. 14-15), as described in more detail below, thereby creating a relatively lower flushing force across the RO membranes 28 and other filtration equipment.

The flush flow chamber 34 may also be changed in numerous other ways to regulate the rate of resetting the flush flow mechanism, and the speed and force of the flush flow when the mechanism activates. For example, lengthening the tube 166 will increase the time it takes the plunger 174 to reseat after the active water purification state, thus decreasing the intervals between flush flows. The same is true in the inverse, i.e., when more frequent flush flows are desired, the system 10 could include a shorter tube 166. Alternatively, a plunger having an outside diameter approximately the same size of the inside diameter of the tube 166 requires greater pressure therein for removal from the seat 178 because of less fluid flow characteristics in and around the plunger 174, thereby increasing the force of the flush flow when the plunger does release. The alternative is, of course, that a relatively larger inside diameter tube 166 and/or a relatively smaller outer diameter plunger will require less force for removal and generate less flush flow force across the system 10.

Figure 14:
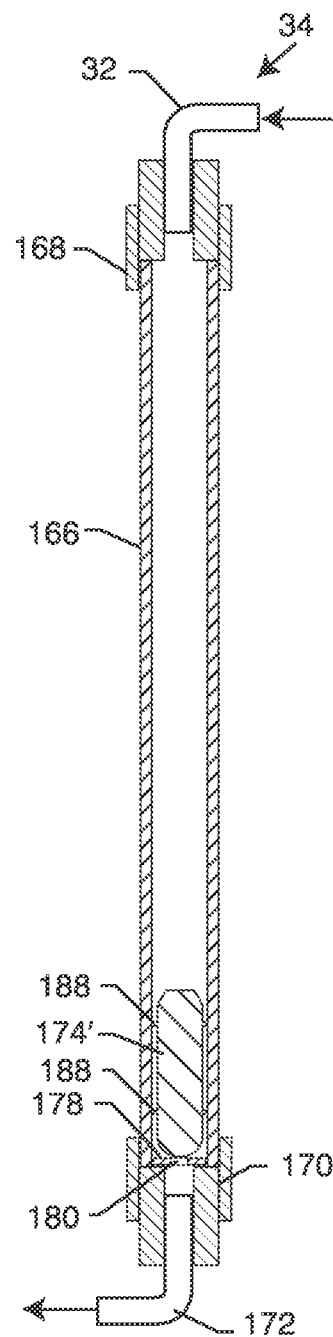
FIG. 14 is a cross-sectional view similar to FIG. 11, illustrating an alternative plunger for use with the flush flow activation chamber disclosed herein.
Figure 15:
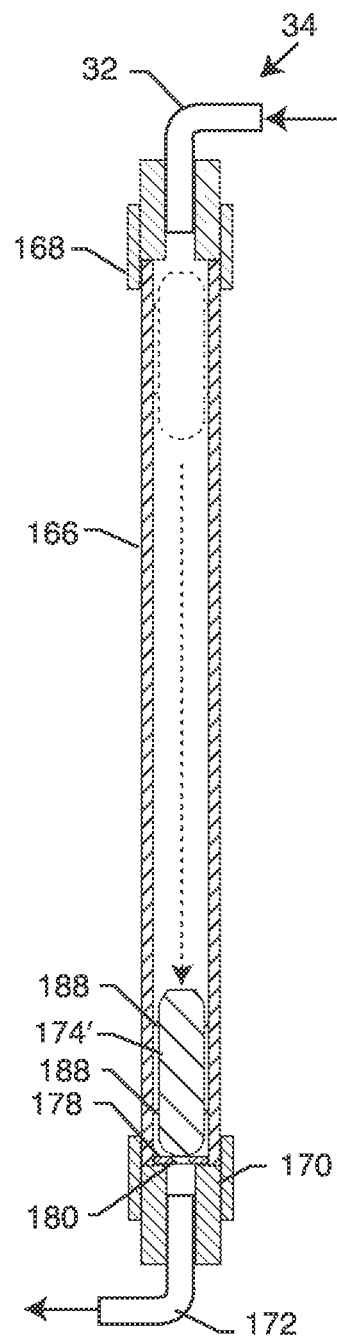
FIG. 15 is a cross-sectional view similar to FIG. 14, illustrating movement of the alternative plunger from a seated position to an unseated position.

Of course, the flow characteristics inside the tube 166 could be governed by other features. For example, in one embodiment as shown in FIGS. 14-15, an alternative plunger 174' may have a set of fins 188 that extend outwardly from the cylindrical body portion 184 thereof to more closely track the internal diameter of the tube 166. In this embodiment, the plunger 174' will tend to resist fluid flow around its body, especially by decreasing the flow characteristics in and around the fins 188. Such increased surface turbulence tends to resist movement within the tube 166, as opposed to laminar flow that may be more readily experienced in and around the smoother cylindrical body portion 184 of the plunger 174. As a result, the system 10 must produce a higher force to dislodge the plunger 174' from the seat 178, which results in a larger flush flow across the RO membranes 28 and other filtration equipment. Of course, a person of ordinary skill in the art will readily recognize that other modifications may be made to the size and shape of the tube 166 and to the plunger 174, 174' to regulate the rate the plunger 174, 174' disengages or reengages the seat 178 in accordance with the embodiments described herein.

For example, in another embodiment, the weight of the plunger 174 has bearing on the operation of the flush flow mechanism. More specifically, in one embodiment where the plunger 174 is used as a sink, increasing the weight of the plunger 174 will increase the rate at which the plunger returns to the seat 178. The same is true in the inverse, namely decreasing the weight of the plunger 174 increases the rate at which it raises within the tube 166 and decreases the rate it falls when the system back pressure is removed. In this case, the flush flow activation occurs less frequently due to the relatively longer time it takes the plunger 174 to reseat. Increasing the weight of the plunger 174 also increases the amount of back pressure required to dislodge the plunger 174 from the seat 178, thereby generating a large flush flow, and vice versa.

Figure 16:
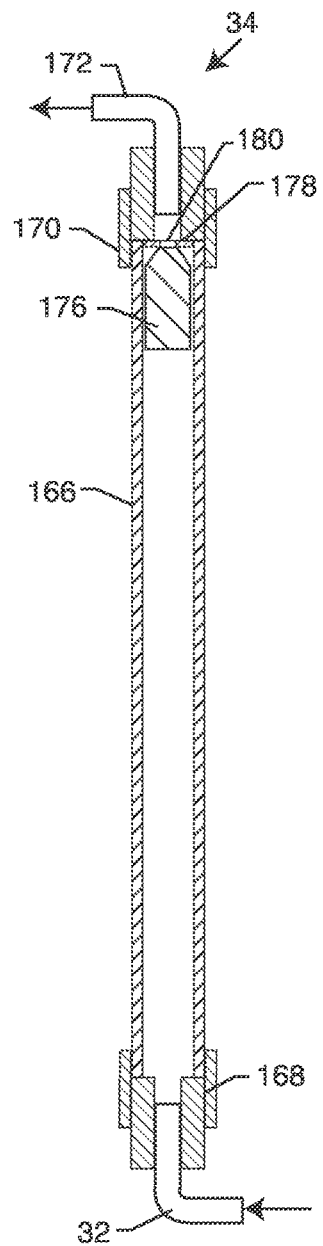
FIG. 16 is a cross-sectional view of an alternative flush flow activation chamber similar to the one disclosed in FIGS. 2 and 11-15, illustrating a float in the seated position substantially occluding brine water outflow.
Figure 17:
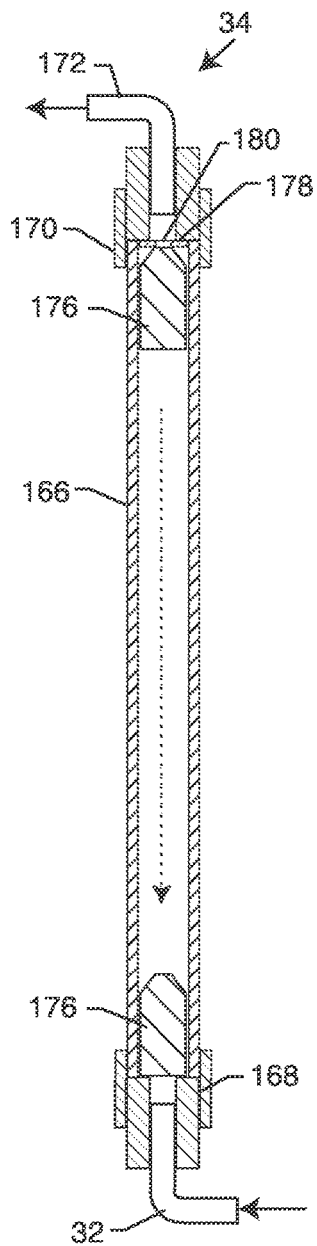
FIG. 17 is an alternative cross-sectional view similar to FIG. 16, illustrating movement of the float from a seated position to an unseated position substantially permitting brine water outflow.
Figure 18:
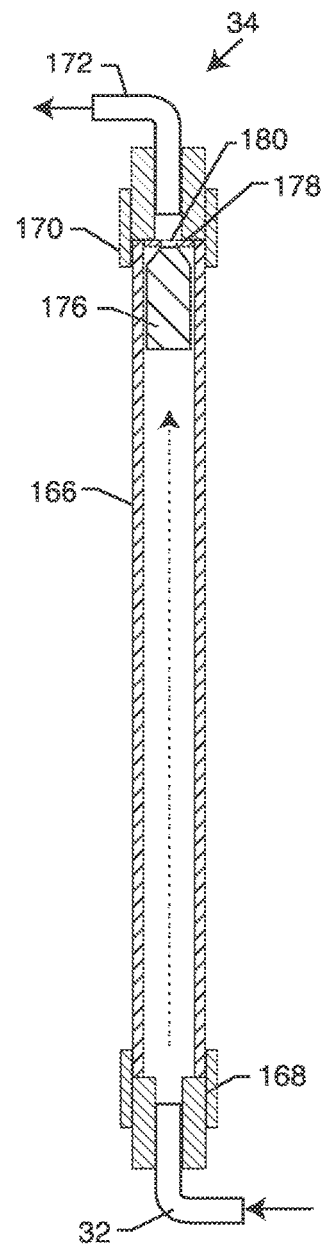
FIG. 18 is an alternative cross-sectional view similar to FIGS. 16 and 17, further illustrating movement of the float from the unseated position to reengage in the seated position again occluding brine water outflow.

In another alternative embodiment, the plunger 174 may be replaced by the float 176, as generally shown with respect to FIGS. 16-18. In this respect, the operational aspects of the flush flow chamber 34 are essentially inversed, i.e., brine water flows into the tube 166 through the flush flow inlet port 168 fluidly coupled to the brine outflow line 32 at the bottom of the tube 166, instead of at the top. The brine water travels up through the tube 166 and out to the drain line 172 through the flush flow exit port 170 at the top of the tube 166. Instead of sinking, the float 176 is buoyant within the tube 166 and tends to rise therein for engagement with the seat 178, as shown in FIGS. 16 and 18. During times of non-use or relatively slow pure water production, the float 176 remains in this engaged position against seat 178. As described above, when the system 10 reengages in the production of pure water through use of the faucets 14, 16 or by refilling the reservoir (if one is used), a vacuum or back pressure forms at the flush flow inlet port 168 as a result of increased fluid flow through the water purification system 10. The float 176 remains engaged to the seat 178 until some threshold back pressure is reached wherein the float 176 pulls away from or otherwise pops out from engagement with the seat 178, which opens the aperture 180 to allow increased brine water outflow through the flush flow exit port 170. Release of this vacuum or back pressure consequently results in a sudden increase or flash flush of tap water inflow in through the tap water inlet line 18. Similarly, this flush flow also has the effect of flashing an increased flow of tap or filtered water through the over the RO filter membranes 28 to effectively dislodge or remove contaminant particulate matter that may have accumulated thereon. Here, increasing the buoyancy of the float 176 increases the rate it returns to the seated position, thereby decreasing the intervals between flush flows, and vice versa.

The flush flow mechanism described above is also particularly useful in intermittently refreshing the particulate catalyst 38 in the particulate filtration cartridge 22. In this respect, the particulate filtration cartridge 22 is in flow coupled relation with the RO filtration cartridge 22 and the flush flow chamber 34. As generally shown in FIG. 2, the particulate filtration cartridge 22 acts as a pre-filter to pre-treat the tap water inflow before delivery to the RO filtration cartridge 26. Although, depending on the desired filtration characteristics of the system 10, a second particulate filtration cartridge 22 may be added after the RO filtration cartridge 26 as a post-filter in addition to or in place of the pre-filter shown in FIG. 2. Accordingly, activation of the flush flow mechanism that results in an increased flow of water through the water filtration system 10 notably increases the tap water inflow into the particulate filtration cartridge 22 through the tap water inlet port 40 from the tap water inlet line 18. In this respect, increased velocity tap water enters the chamber 42 before upflowing into the catalyst cleansing chamber 54 through the lower screens 48 to relatively dramatically increase and sufficiently lift and turbulently stir the particulate catalyst 38 throughout the entire chamber volume, as viewed in FIG. 10. As this rapid flush flow occurs through the catalyst cleaning chamber 54, the catalyst particles tumble and abrade against one another in the form of a turbulent fluidized bed, thereby abrading off the formed oxidation layer thereon for eventual removal from the particulate filtration cartridge 22 through the outlet 68. Importantly, as a result, the particulate catalyst 38 is effectively renewed or refreshed for enhanced effectiveness with an extended service life compatible with the extended service life of the RO membranes 28. Closing the cold water faucet 14 or the hot water faucet 16 causes this rapid flush flow through the particulate catalyst 38 to cease, and relatively slower water filtration production resumes, again allowing the catalyst particles 38 to re-settle into the bed configuration shown for example in FIGS. 5-8. While the illustrative drawings show the lower filter screen 48 at the lower end of the catalyst cleaning chamber 54, persons skilled in the art will appreciate that alternative water inflow geometries that cause contact with the particulate catalyst 38 may be used. Such alternative water inflow configurations may include, but are not limited to, upwardly jetted arrangements conducive to substantially thorough fluidization of the particulate catalyst 38 when the cold water faucet 14 or the hot water faucet 16 is turned on, and for substantially thorough water-particulate contact without fluidization during pure water production with the cold and hot water faucets 14, 16 turned off.

Although several embodiments have been described in detail for purposes of illustration, various modifications may be made without departing from the scope and spirit of the invention. Accordingly, the invention is not to be limited, except as by the appended claims.

What is claimed is:

1. A water purification system for flow-coupled installation with a tap water inflow for producing a relatively purified water outflow, comprising:
   a purification unit having a tap water inlet port for receiving said tap water inflow and a purified water outlet port for dispensing said purified water outflow from said purification unit;
   a particulate catalyst retained within said purification unit and in flow through relation relative to said tap water inflow and said purified water outflow, for catalyzing contaminants as said tap water inflow travels through said purification unit;
   a mechanical agitator configured to intermittently contact a portion of said purification unit to translate vibrations to said particulate catalyst for substantially preventing channeling thereof during relatively slow tap water inflow through said purification unit; and
   a particulate catalyst cartridge housing said particulate catalyst between an upper filter screen and a lower filter screen to generally form a catalyst cleansing chamber therebetween for receiving translated vibrations from said mechanical agitator.

2. The water purification system of claim 1, wherein said purification unit includes a reverse osmosis (RO) filter having an RO membrane for separating relatively unfiltered water flow into said purified water outflow and a brine water outflow having impurities concentrated therein and discharged from said purification unit through a brine water outflow port.

3. The water purification system of claim 2, including a flush flow activation chamber fluidly coupled to said brine water outflow and having a plunger therein for substantially occluding said brine water outflow through said brine water outflow port when in a first seated position, and substantially permitting brine water outflow through said brine water outflow port when in a second unseated position.

4. The water purification system of claim 3, wherein said activation chamber generates back pressure within said water purification system to flash flow said tap water inflow into said purification unit and through said particulate catalyst and said RO membrane when said plunger moves from said first position to said second position, thereby substantially agitating said particulate catalyst and refreshing said RO membrane.

5. The water purification system of claim 3, wherein said plunger comprises an elongated cylindrical body having a substantially frusto-conical head sized for at least partial insertion into a seat in the activation chamber.

6. The water purification system of claim 5, wherein said plunger includes a channel in said frusto-conical head permitting said brine water outflow through said brine water outflow port when said plunger is in said first position.

7. The water purification system of claim 3, wherein said plunger comprises a float.

8. The water purification system of claim 3, wherein said plunger includes a fin at least partially increasing fluid turbulence within said activation chamber for increasing activation back pressure.

9. The water purification system of claim 1, wherein said water purification system mounts to a water dispensing system having a cabinet with a hot water faucet and a cold water faucet fluidly coupled to said purified water outlet port.

10. The water purification system of claim 1, wherein said mechanical agitator comprises a multi-axial movable base having a slot therein sized for selective reception of an extension protruding outwardly from said catalyst cartridge, said base movable to intermittently contact said extension.

11. The water purification system of claim 1, wherein said mechanical agitator includes a first magnet in an at least a partial magnetic repulsion position relative to a second magnet of said catalyst cartridge such that movement of said mechanical agitator translates reciprocal vibrational movement to said catalyst cartridge through magnetic repulsion of said first magnet relative to said second magnet.

12. A water purification system for flow-coupled installation with a tap water inflow for producing a relatively purified water outflow, comprising:
  a purification unit having a tap water inlet port for receiving said tap water inflow and a purified water outlet port for dispensing said purified water outflow from said purification unit;
  a particulate catalyst retained within said purification unit and in flow through relation relative to said tap water inflow and said purified water outflow, for catalyzing contaminants as said tap water inflow travels through said purification unit;
  a particulate agitator comprising a movable first magnet in at least partial magnetic repulsion relation relative to a second magnet associated with said purification unit such that movement of said first magnet translates reciprocal vibrational movement to said purification unit through magnetic repulsion of said first magnet relative to said second magnet, thereby substantially preventing channeling of said particulate catalyst during relatively slow tap water inflow through said purification unit;
  an RO filter having an RO membrane for separating relatively unfiltered water flow into said purified water outflow and a brine water outflow having impurities concentrated therein and discharged from said purification unit through a brine water outflow port; and a flush flow activation chamber fluidly coupled to said brine water outflow and having a plunger therein for substantially occluding said brine water outflow port when in a first seated position, and substantially permitting brine water outflow through said brine water outflow port when in a second unseated position.

13. A water purification system for flow-coupled installation with a tap water inflow for producing a relatively purified water outflow for use in a water dispensing system having a cabinet with a hot water faucet and a cold water faucet fluidly coupled to said purified water outflow, comprising:
  a purification unit having a tap water inlet port for receiving said tap water inflow and a purified water outlet port for dispensing said purified water outflow from said purification unit;
  a particulate catalyst cartridge housing having a pair of upper and lower filter screens therein generally forming a catalyst cleansing chamber therebetween;
  a particulate catalyst retained within said particulate catalyst housing and in flow through relation relative to said tap water inflow and said purified water outflow, for catalyzing contaminants as said tap water inflow travels through said purification unit;
  a mechanical particulate agitator comprising a multi-axial movable base having a slot therein sized for selective reception of an extension protruding outwardly from said purification unit, said base movable to intermittently contact said extension to translate vibrations to said particulate catalyst cartridge housing for substantially preventing channeling of said particulate catalyst during relatively slow tap water inflow through said purification unit; and an activation chamber for generating back pressure within said water purification system to flash flow said tap water inflow into said purification unit and through said particulate catalyst when a float moves from a first seated position to a second unseated position, thereby substantially agitating said particulate catalyst.

14. The water purification system of claim 13, wherein said mechanical agitator includes a first magnet in an at least a partial magnetic repulsion position relative to a second magnet of said catalyst cartridge such that movement of said mechanical agitator translates reciprocal vibrational movement to said catalyst cartridge through magnetic repulsion of said first magnet relative to said second magnet and wherein said float includes a fin at least partially increasing fluid turbulence within said activation chamber for increasing activation back pressure.

15. The water purification system of claim 13, wherein said float comprises an elongated cylindrical body having a substantially frusto-conical head sized for at least partial nested reception into an activation chamber seat, said frusto-conical head permitting said brine water outflow through said brine water outflow port when said float is in said first seated position.

16. The water purification system of claim 13, wherein said purification unit includes a reverse osmosis (RO) filter having an RO membrane for separating relatively unfiltered water flow into said purified water outflow and a brine water outflow having impurities concentrated therein and discharged from said purification unit through a brine water outflow port.

17. The water purification system of claim 16, including a flush flow activation chamber fluidly coupled to said brine water outflow and having a plunger therein for substantially occluding said brine water outflow through said brine water outflow port when in a first seated position, and substantially permitting brine water outflow through said brine water outflow port when in a second unseated position.

18. The water purification system of claim 17, wherein said activation chamber generates back pressure within said water purification system to flash flow said tap water inflow into said purification unit and through said particulate catalyst and said RO membrane when said plunger moves from said first position to said second position, thereby substantially agitating said particulate catalyst and refreshing said RO membrane.

19. The water purification system of claim 17, wherein said plunger comprises an elongated cylindrical body having a substantially frusto-conical head sized for at least partial insertion into a seat in the activation chamber.

20. The water purification system of claim 19, wherein said plunger includes a channel in said frusto-conical head permitting said brine water outflow through said brine water outflow port when said plunger is in said first position.

21. The water purification system of claim 17, wherein said plunger comprises a float.

22. The water purification system of claim 17, wherein said plunger includes a fin at least partially increasing fluid turbulence within said activation chamber for increasing activation back pressure.

* * * * *